Patented July 21, 1953

2,646,443

UNITED STATES PATENT OFFICE 2,646,443

METHOD OF PRODUCING 1,4-DICYANO-2-BUTENE

Gerald Clayton Bassler, Pittsburgh, Pa., assignor to Libbey-Owens-Ford Glass Company, Toledo, Ohio, a corporation of Ohio No Drawing. Application May 15, 1951,
Serial No. 226,535

1 Claim. (Cl. 260—465.8)

The invention relates to an improved method of producing 1,4-dicyano-2-butene from 2-butene-1,4-diol.

There is a potential demand for 1,4-dicyano-2-butene as an intermediate in the production of synthetic resins. Although this substance has been produced by a reaction in which a dihalobutene is used as the starting material, in such reaction the halogen of the dihalobutene is lost in the form of a waste product such as sodium chloride or calcium chloride. The use of 2-butene-1,4-diol as the starting material is potentially more economical than the use of a dihalobutene, because the production of 1,4-dicyano-2-butene from 2-butene-1,4-diol does not involve loss of halogen.

The principal object of the invention is to provide an economical method of producing 1,4-dicyano-2-butene in high yields from 2-butene-1,4-diol. More specific objects and advantages are apparent from the description, which illustrates and discloses but is not intended to limit the scope of the invention.

The method heretofore used for the production of 1,4-dicyano-2-butene from 2-butene-1,4-diol has consisted in reacting 2-butene-1,4-diol and hydrogen cyanide in the presence of cuprous chloride. The yields of 1,4-dicyano-2-butene obtained by this method have been very unsatisfactory and have ranged from 3 to 12 per cent.

The present invention is based upon the discovery that a remarkable improvement in the yield of 1,4-dicyano-2-butene is obtained by using cuprous bromide in place of cuprous chloride as the catalyst in the reaction between 2-butene-1,4-diol and hydrogen cyanide. The improved yield obtained by the use of this catalyst has been demonstrated as follows:

The procedure heretofore used for the preparation of 1,4-dicyano-2-butene from 2-butene-1,4-diol and hydrogen cyanide was carried out as follows: A mixture of ammonium chloride (6.24 grams), distilled water (10.2 ml.), and cuprous chloride (11.4 grams) was placed in a 3-necked 500 ml. flask equipped with a mercury sealed stirrer, reflux condenser, jacketed funnel and gas inlet tube. The condenser and jacketed funnel were cooled with ice water. The flask was then heated to a temperature of 80 degrees C. by means of a heating mantle, and powdered copper (0.16 gram) and concentrated hydrochloric acid (0.23 ml. were then added. During this and the subsequent procedure a slow stream of nitrogen was continuously passed through the flask. A mixture of hydrogen cyanide (63 grams) and 2-butene-1,4-diol (100 grams) was added to the flask from the funnel over a period of about four and one-half hours, the reaction temperature being maintained at approximately 80 degrees C. during this addition. The mixture was allowed to stand overnight, the unreacted hydrogen cyanide being expelled during this time by means of a stream of nitrogen. The reactor contents were then extracted with toluene (three portions of 200 ml. each) and the combined extracts were dried over anhydrous potassium carbonate. The dried toluene extracts were distilled under reduced pressure. After removal of toluene, there was obtained 14.2 grams of 1,4-dicyano-2-butene, which solidified rapidly, melting point 74 to 77 degrees C.

Preparation of 1,4-dicyano-2-butene from 2-butene-1,4-diol and hydrogen cyanide in accordance with the present method was then carried out as follows:

A mixture of ammonium bromide (10 grams), distilled water (9 ml.), cuprous bromide (14.5 grams), powdered copper (1 gram) and hydrobromic acid (0.2 ml. of an aqueous solution comprising 48 per cent by weight of HBr) was placed in a bomb (previously cooled in an ice bath) which consists of a stainless steel cylindrical cup having an inside diameter of 3 inches, an outside diameter of 3½ inches, and an inside depth of 8 inches, lined with a Pyrex glass liner, and fitted with a pressure head that is held against the top of the cup by bolts and is sealed with a neoprene gasket. The cup has a bottom ¼ inch thick welded in with a stainless steel weld. A mixture of 2-butene-1,4-diol (88 grams) and hydrogen cyanide (57.5 grams) was then added to the reactor, which was then sealed. Nitrogen was passed in under pressure through the valve and allowed to escape to remove air. This procedure was repeated to guarantee complete expulsion of air. The assembled reaction vessel was then placed in an electrical heating jacket and was agitated by means of a motor-driven mechanism while the reaction mixture was heated to a temperature of 100 degrees C. and held at that temperature for four hours. The reactor was then cooled to about 50 degrees C. and was vented to an ice-water trap. The valve was opened to expel unreacted hydrogen cyanide (20 ml.), which was recovered in the ice-water trap. The reactor contents, which consisted of a dark liquid and a crystalline material, were then extracted with chloroform (three portions of 200 ml. each), and the combined extracts were dried over anhydrous potassium carbonate. The dried chloroform extracts were distilled under reduced pressure to remove the chloroform, and the distillation residue was crystallized from water to obtain 37.9 grams of 1,4-dicyano-2-butene.

As the above results indicate, a substantially greater yield of 1,4-dicyano-2-butene is obtained from the reaction of 2-butene-1,4-diol and hydrogen cyanide in the presence of cuprous bromide in accordance with the present method than has been obtained heretofore by carrying the reaction out in the presence of cuprous chloride (i. e., a yield of only 11.8 per cent is obtained using a cuprous chloride catalyst, as contrasted to a yield of 35.8 per cent using a cuprous bromide catalyst in accordance with the present method). (The terms "per cent" and "parts" are used herein to mean per cent and parts, by weight unless otherwise specified.) Even when the method used heretofore is modified by carrying the reaction out under pressure (i. e., using the apparatus described for carrying out the reaction by the present method), the yield obtained after heating for four hours at 100 degrees C. averages only about 10 per cent, and under the most carefully controlled conditions of temperature, time and pressure is never higher than about 25 per cent, whereas under such conditions the yield obtained by the present method averages about 50 per cent and may be over 60 per cent.

The method of the present invention may be carried out either as a batch process (i. e., in a bomb) or as a continuous process (i. e., by conducting the 2-butene-1,4-diol, hydrogen cyanide and cuprous bromide catalyst through a reaction zone and then separating the cuprous bromide and the reactants from the 1,4-dicyano-2-butene). Although the following discussion is concerned with the present method conducted as a batch process, the considerations that apply to the present method conducted as a continuous operation are the same as those that govern the operating temperature ranges, proportions of ingredients and pressure in a batch process.

When the present method is conducted as a batch operation, the cuprous bromide (or reagents for forming cuprous bromide, as hereinafter discussed), hydrogen cyanide and 2-butene-1,4-diol are usually introduced either severally or in admixture at room temperature into a steel bomb (equipped with suitable means for agitation), which preferably is cooled before the addition, in an ice bath. After the addition of these ingredients is complete, the reactor ordinarily is flushed with an inert gas such as nitrogen to eliminate as much air as possible. The sealed reactor is then agitated and heated at a reasonably rapid rate to reaction temperature.

In general, the minimum temperature at which a substantial yield of 1,4-dicyano-2-butene is obtained varies with the specific reaction time employed. A good yield (e. g., at least 35 per cent) ordinarily may be obtained using a temperature as low as about 80 degrees C. with a reaction time of about four to eight hours. However, substantially increased yields ordinarily are obtained using a slightly higher temperature, for example 100 to 125 degrees C. with a slightly shorter reaction time, for example one to four hours. Although a temperature higher than about 125 degrees C. may be employed with an even shorter reaction time, it is preferable that the reaction time be at least one hour and, accordingly, there is no particular advantage in using a temperature higher than about 125 degrees C.

The proportion of hydrogen cyanide employed in the present method may be as low as about 2 mols per mol of 2-butene-1,4-diol, but it is preferable that it be at least about 2.2 mols per mol of 2-butene-1,4-diol, and it is most desirable that it be at least 2.3 mols per mol of 2-butene-1,4-diol. Ordinarily, no substantial increase in the yield of 1,4-dicyano-2-butene can be obtained when the proportion of hydrogen cyanide is greater than about 6 mols per mol of 2-butene-1,4-diol, and it is preferable to use not more than about 4.5 mols and most desirable to use not more than 2.8 mols of hydrogen cyanide per mol of 2-butene-1,4-diol.

Although the proportion of cuprous bromide may be as low as 0.05 mol per mol of 2-butene-1,4-diol, it is preferable to use at least 0.15 mol of cuprous bromide per mol of 2-butene-1,4-diol and it is most desirable to use at least 0.2 mol of cuprous bromide per mol of 2-butene-1,4-diol. Although the proportion of cuprous bromide may be as high as about 0.42 mol per mol of 2-butene-1,4-diol, it is preferable that it be not higher than about 0.3 mol, and it is most desirable that it be not higher than 0.25 mol per mol of 2-butene-1,4-diol.

The cuprous bromide employed as a catalyst in the present method may be initially added to the reactor as such, or at least part of it may be formed in situ during the reaction. For example, the cuprous bromide may be formed by initially adding to the reactor a mixture of powdered copper, ammonium bromide and hydrobromic acid, or a mixture of powdered copper and hydrobromic acid. If desired, cuprous bromide may be derived from a mixture of cuprous chloride and a bromide salt such as ammonium bromide or potassium bromide. A mixture of ammonium bromide and cuprous chloride is particularly useful, since it produces a substantial amount of cuprous bromide. In fact a very small amount of cuprous bromide may be used with a large amount of cuprous chloride to obtain substantially the same effect as using a larger amount of cuprous bromide. For example, as much as about nine parts of cuprous chloride to one part of cuprous bromide may be used to obtain approximately the same yield of 1,4-dicyano-2-butene that may be obtained using about 10 parts of cuprous bromide. Since cuprous chloride is less expensive than cuprous bromide, this is a preferred procedure for obtaining the effect of cuprous bromide more economically.

In order to obtain the optimum improvement in the yield of 1,4-dicyano-2-butene that can be achieved using cuprous bromide as a catalyst in the reaction between 2-butene-1,4-diol and hydrogen cyanide in accordance with the present method, the reaction should be carried out at superatmospheric pressure. The minimum pressure employed is that which is necessary to keep the reactants in the proportions hereinbefore described in contact with each other, whereas the maximum pressure is the autogenous pressure developed by the reactants during the formation of 1,4-dicyano-2-butene.

When the reaction is complete, the bomb is ordinarily cooled to about 50 degrees C. and unreacted hydrogen cyanide is expelled and may be collected by venting to an ice-water trap. If the bomb is cooled to room temperature, it may be heated gently to expel the hydrogen cyanide. The liquid contents of the bomb ordinarily are mixed with a solvent such as toluene or chloroform to extract the 1,4-dicyano-2-butene. The solvent may then be separated from the 1,4-dicyano-2-butene by distillation under reduced pressure before recovering the 1,4-dicyano-2-butene, either by continuing the distillation under low pressure or by crystallization (for example, from water or alcohol).

EXAMPLE 1

A series of twenty-six reactions between hydrogen cyanide and 2-butene-1,4-diol in the presence of cuprous bromide is carried out as follows:

A catalyst (cuprous bromide and/or reagents for forming cuprous bromide) is placed in a bomb (the stainless steel reactor hereinbefore described) which has been previously cooled in an ice bath. A mixture of 2-butene-1,4-diol and hydrogen cyanide is then added to the bomb, which is then sealed and flushed with nitrogen to expel air. The assembled reaction vessel is then placed in an electrical heating jacket, and is agitated by means of a motor-driven mechanism during the reaction. At the end of the reaction the reactor is cooled to about 50 degrees C. and is vented to an ice-water trap. The valve is opened to expel unreacted hydrogen cyanide, which is recovered in the ice-water trap. The reactor contents are then extracted with chloroform (three portions of 200 ml. each) and the combined extracts are dried over anhydrous potassium carbonate. The dried chloroform extracts are distilled under reduced pressure to remove the chloroform and 1,4-dicyano-2-butene is obtained by crystallization from the distillation residue. Table 1 below more specifically describes the series of reactions by specifying the number of mols of 2-butene-1,4-diol (column 2), the number of mols of hydrogen cyanide (column 3), the reagents and their proportions from which the cuprous bromide catalyst is derived (column 4) and the yield of 1,4-dicyano-2-butene (column 5). In each run, the reaction temperature is 100 degrees C. and the reaction time is four hours, except where indicated in parentheses after the yield.

Table 1

| Col. 1 Run | Col. 2 Mols 2-butene-1,4-diol | Col. 3 Mols Hydrogen cyanide | Col. 4 Catalyst | Col. 5 Percent yield |
|---|---|---|---|---|
| 1 | 1 | 5.9 | $Cu_2Br_2$, 0.157 mol.; 48% HBr, 1.8 ml.; $NH_4Br$, 0.206 mol.; water, 27 ml.; powdered copper, 0.028 mol. | 54.6. |
| 2 | 1 | 2.33 | Same as run 1 | 63.1. |
| 3 | 1 | 2.33 | $Cu_2Br_2$, 0.208 mol.; conc. HCl 2.28 ml.; $NH_4Cl$, 0.384 mol.; water, 34 ml.; powdered copper, 0.036 mol. | 55.1. |
| 4 | 1 | 2.33 | Same as run 1 | 47.1 (1 hr.). |
| 5 | 1 | 2.33 | $Cu_2Br_2$, 0.208 mol.; Conc. HBr, 3.06 ml.; $NH_4Br$, 0.257 mol.; water, 34.3 ml.; powdered copper, 0.036 mol. | 55.5. |
| 6 | 2 | 4.66 | $Cu_2Br_2$, 0.416 mol.; Conc. HBr, 6.12 ml.; $NH_4Br$, 0.514 mol.; water, 68.6 ml.; powdered copper, 0.072 mol. | 42.0. |
| 7 | 1 | 2.33 | Same as run 5 | 37.0 (80° C.). |
| 8 | 1 | 2.33 | $Cu_2Br_2$, 0.208 mol.; $NH_4Br$, 0.257 mol; water, 34.3 ml.; powdered copper, 0.036 mol. | 40.0. |
| 9 | 1 | 2.33 | $Cu_2Br_2$, 0.208 mol.; Conc. HBr, 3.06 ml.; water, 34.3 ml.; powdered copper, 0.036 mol. | 30.0. |
| 10 | 1 | 2.33 | Same as run 5 | 50.0 (8 hrs.). |
| 11 | 1 | 2.33 | $Cu_2Br_2$, 0.208 mol.; Conc. HBr, 3.06 ml.; $NH_4Br$, 0.257 mol.; powdered copper, 0.036 mol. | 52.0. |
| 12 | 1 | 2.33 | $Cu_2Br_2$, 0.208 mol; Conc. HBr, 3.06 ml.; $NH_4Br$, 0.257 mol; water, 34.3 ml.; powdered copper, 0.072 mol. | 51.0. |
| 13 | 1 | 2.33 | $Cu_2Br_2$, 0.208 mol; Conc. HBr, 3.06 ml.; $NH_4Br$, 0.257 mol; water, 68.6 ml.; powdered copper, 0.036 mol. | 43.0. |
| 14 | 1 | 2.33 | HBr, 0.416 mol; $NH_4Br$, 0.257 mol; powdered copper, 0.416 mol. | 28.0. |
| 15 | 1 | 2.33 | HBr, 0.416 mol; powdered copper, 0.416 mol. | 34.0. |
| 16 | 1 | 2.33 | $Cu_2Br_2$, 0.208 mol; $NH_4Cl$, 0.257 mol. | 50.0. |
| 17 | 1 | 2.33 | $Cu_2Br_2$, 0.208 mol; powdered copper, 0.036 mol. | 48. |
| 18 | 1 | 2.33 | $Cu_2Br_2$, 0.104 mol; powdered copper, 0.018 mol. | 37. |
| 19 | 1 | 2.33 | $Cu_2Br_2$, 0.416 mol; powdered copper, 0.072 mol. | 31. |
| 20 | 1 | 4.66 | same as run 17 | 57. |
| 21 | 1 | 2.33 | do | 48 (125° C.). |
| 22 | 1 | 2.33 | $Cu_2Br_2$, 0.104 mol; powdered copper, 0.036 mol. | 35. |
| 23 | 1 | 2.33 | $Cu_2Br_2$, 0.208 mol | 43 (125° C., 1 hr.). |
| 24 | 1 | 2.33 | $Cu_2Br_2$, 0.156 mol | 55. |
| 25 | 1 | 2.33 | $Cu_2Br_2$, 0.312 mol | 38. |
| 26 | 1 | 2.33 | $Cu_2Br_2$, 0.104 mol | 39. |

EXAMPLE 2

(a) A mixture of cuprous bromide (0.02 mol) and cuprous chloride (0.19 mol) is placed in a bomb (the stainless steel reactor hereinbefore described) and a mixture of 2-butene-1,4-diol (1 mol) and hydrogen cyanide (2.33 mols) is then added to the reactor. The reactor is sealed and flushed with nitrogen. The reaction mixture is then agitated and heated for four hours at 100 degrees C. The reactor is then cooled to about 50 degrees C. and is vented to an ice-water trap. The valve is opened to expel unreacted hydrogen cyanide. The reactor contents are extracted with chloroform (three portions of 200 ml. each) and the combined extracts are dried over anhydrous potassium carbonate. The dried chloroform extracts are distilled under reduced pressure to remove the chloroform, and the distillation residue is crystallized from water to obtain a 44 per cent yield of 1,4-dicyano-2-butene.

When the procedure described in the preceding paragraph is repeated using 0.208 mol of cuprous chloride and no cuprous bromide, the yield of 1,4-dicyano-2-butene is only 15 per cent.

(b) The procedure described in (a) is repeated except that in place of the cuprous bromide-cuprous chloride mixture, a mixture of 0.208 mol of cuprous chloride and 0.257 mol of ammonium bromide is employed. The yield of 1,4-dicyano-2-butene is 48 per cent.

(c) The procedure described in (b) is repeated except that potassium bromide (0.257 mol) is used in place of the ammonium bromide. The yield of 1,4-dicyano-2-butene is 25 per cent.

Having described the invention, I claim:

A method of producing 1,4-dicyano-2-butene in improved yields that comprises reacting 2-butene-1,4-diol and hydrogen cyanide in the presence of cuprous bromide.

GERALD CLAYTON BASSLER.

References Cited in the file of this patent

UNITED STATES PATENTS

| Number | Name | Date |
| --- | --- | --- |
| 2,477,573 | Borcherdt | Aug. 2, 1949 |
| 2,485,225 | Webb | Oct. 18, 1949 |
| 2,488,913 | Huggill et al. | Nov. 22, 1949 |

FOREIGN PATENTS

| Number | Country | Date |
| --- | --- | --- |
| 619,577 | Great Britain | Mar. 11, 1949 |
| 646,966 | Great Britain | Nov. 29, 1950 |